United States Patent
Ando et al.

(10) Patent No.: US 12,044,131 B2
(45) Date of Patent: Jul. 23, 2024

(54) LABYRINTH SEAL AND GAS TURBINE

(71) Applicant: KAWASAKI JUKOGYO KABUSHIKI KAISHA, Kobe (JP)

(72) Inventors: Takahiro Ando, Kobe (JP); Shoichi Shimomura, Kobe (JP); Naoya Tanabashi, Kobe (JP); Shinya Makino, Kobe (JP); Masahiro Yamamoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 57 days.

(21) Appl. No.: 17/915,318

(22) PCT Filed: Mar. 10, 2021

(86) PCT No.: PCT/JP2021/009569
§ 371 (c)(1),
(2) Date: Sep. 28, 2022

(87) PCT Pub. No.: WO2021/199993
PCT Pub. Date: Oct. 7, 2021

(65) Prior Publication Data
US 2023/0145667 A1    May 11, 2023

(30) Foreign Application Priority Data
Mar. 31, 2020   (JP) .................. 2020-064025

(51) Int. Cl.
*F01D 11/02*    (2006.01)
*F02C 7/28*    (2006.01)

(52) U.S. Cl.
CPC ............... *F01D 11/02* (2013.01); *F02C 7/28* (2013.01); *F05D 2250/18* (2013.01)

(58) Field of Classification Search
CPC ........ F01D 11/00; F01D 11/02; F01D 11/025; F01D 11/08; F02C 7/00; F02C 7/28;
(Continued)

(56) References Cited

U.S. PATENT DOCUMENTS 7,971,882 B1 * 7/2011 Liang ................. F16J 15/444
277/420
8,002,286 B1 * 8/2011 El-Aini ................ F01D 11/02
277/412
(Continued)

FOREIGN PATENT DOCUMENTS

JP         2019-49346 A    3/2019

OTHER PUBLICATIONS

International Search Report for PCT/JP2021/009569 dated Apr. 6, 2021.

*Primary Examiner* — Nathan Cumar
(74) *Attorney, Agent, or Firm* — Sughrue Mion, PLLC

(57) ABSTRACT

Provided is a labyrinth seal including a first structure; and a second structure opposing the first structure. The first structure includes seal fins located at intervals in an axial direction and extending toward the second structure; a downstream wall surface located most downstream one of the seal fins and extending toward the second structure. A tip of the downstream wall surface located at a side of a tip of the most downstream seal fin, the side being close to the second structure in a radial direction and having a first outlet surface extending from the tip of the downstream wall surface toward a downstream side. The second structure includes a second outlet surface opposing the first outlet surface, a radial gap between the first outlet surface and the second outlet surface; and a cavity surface located upstream of the second outlet surface recessed away from the first structure.

5 Claims, 2 Drawing Sheets

(58) Field of Classification Search
CPC ............. F05D 2250/00; F05D 2250/18; F05D 2250/181; F05D 2250/182; F05D 2250/183
USPC .................................................. 277/412, 418
See application file for complete search history.

(56) References Cited

U.S. PATENT DOCUMENTS

| | | | |
|---|---|---|---|
| 2007/0059158 A1* | 3/2007 | Alvanos | F01D 5/081 |
| | | | 415/115 |
| 2018/0187567 A1* | 7/2018 | Morinaka | F01D 11/02 |
| 2019/0072185 A1* | 3/2019 | Morinaka | F16J 15/4472 |
| 2019/0136863 A1* | 5/2019 | Morinaka | F04D 29/10 |

* cited by examiner

LABYRINTH SEAL AND GAS TURBINE

CROSS REFERENCE TO RELATED APPLICATIONS

This application is a National Stage of International Application No. PCT/JP2021/009569 filed Mar. 10, 2021, claiming priority based on Japanese Patent Application No. 2020-064025 filed Mar. 31, 2020.

TECHNICAL FIELD

The present disclosure relates to a labyrinth seal and a gas turbine.

BACKGROUND ART

In rotary machines, such as gas turbines, a labyrinth seal may be located between a rotary body and a stationary body to prevent a gas from passing and leaking through between the rotary body and the stationary body. The labyrinth seal may include a seal fin that is located at one of a structure of the rotary body and a structure of the stationary body and extends to the other of the structure of the rotary body and the structure of the stationary body (see PTL 1). By using the seal fin, a gap (hereinafter referred to as an "opposing gap") between the structure of the rotary body and the structure of the stationary body can be made small, and as a result, a leakage amount of gas can be suppressed.

CITATION LIST

Patent Literature

PTL 1: Japanese Laid-Open Patent Application Publication No. 2019-49346

SUMMARY OF INVENTION

Technical Problem

However, according to the labyrinth seal including the seal fin, by the rotation of the rotary body, a tip of the seal fin is brought into contact with an opposing surface and is worn away. As a result, the opposing gap gradually increases in size, and the effect of suppressing the leakage amount of gas by the seal fin gradually deteriorates. To be specific, there is a limit to the suppression of the leakage amount by reducing the size of the opposing interval using the seal fin.

The present disclosure was made under these circumstances, and an object of the present disclosure is to provide a labyrinth seal and a gas turbine, each of which can effectively suppress a leakage amount of gas at an outlet portion.

Solution to Problem

A labyrinth seal according to one aspect of the present disclosure includes: a first structure; and a second structure opposed to the first structure. The first structure includes: seal fins located at intervals in an axial direction and extending toward the second structure; a downstream wall surface located downstream of a most downstream one of the seal fins and extending toward the second structure, a tip of the downstream wall surface being located at a side of a tip of the most downstream seal fin, the side being close to the second structure in a radial direction; and a first outlet surface extending from the tip of the downstream wall surface toward a downstream side in the axial direction. The second structure includes: a second outlet surface opposed to the first outlet surface, a radial gap being between the first outlet surface and the second outlet surface; and a cavity surface located upstream of the second outlet surface in the axial direction and adjacent to the second outlet surface, the cavity surface being recessed in a direction away from the first structure.

According to this configuration, the gas having passed through the most downstream seal fin collides with the downstream wall surface, then flows along the downstream wall surface, and further flows along the cavity surface. With this, a vortex is generated in a downstream space surrounded by the most downstream seal fin, the downstream wall surface, and the cavity surface. As a result, even when the dimension of the gap between the first downstream surface and the second downstream surface which is the outlet of the downstream space is slightly large, the outflow of the gas through the gap between the first downstream surface and the second downstream surface can be suppressed. Therefore, according to the above labyrinth seal, a leakage amount of gas at an outlet portion can be effectively suppressed.

A gas turbine according to one aspect of the present disclosure includes the above labyrinth seal.

Advantageous Effects of Invention

The present disclosure can provide a labyrinth seal and a gas turbine, each of which can effectively suppress a leakage amount of gas at an outlet portion.

DESCRIPTION OF EMBODIMENTS

Embodiment 1

Hereinafter, embodiments of the present disclosure will be described. First, a labyrinth seal 100 according to Embodiment 1 will be described.

Figure 1:
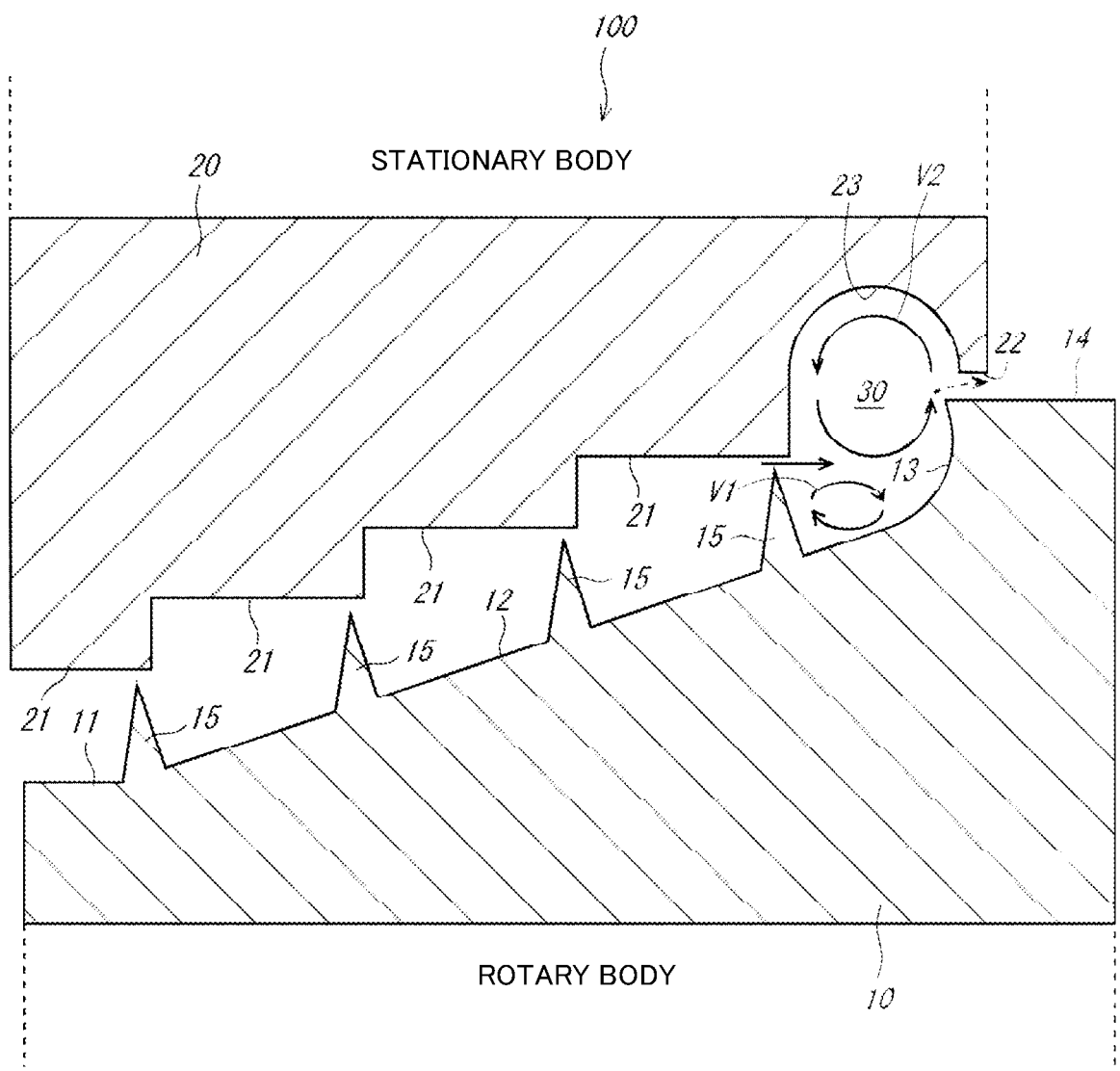
FIG. 1 is a sectional view of a labyrinth seal according to Embodiment 1.

FIG. 1 is a sectional view of the labyrinth seal 100 according to Embodiment 1. The labyrinth seal 100 is located at a rotary machine, such as a gas turbine. More specifically, the labyrinth seal 100 is located between a stationary body, such as a casing, and a rotary body, such as a shaft. Therefore, the labyrinth seal 100 has an annular shape.

In FIG. 1, a paper surface left-right direction is an axial direction of the labyrinth seal 100, and a paper surface upper-lower direction is a radial direction of the labyrinth seal 100. Moreover, a paper surface upper side is a radially outer side of the labyrinth seal 100, and a paper surface lower side is a radially inner side of the labyrinth seal 100. Furthermore, in FIG. 1, a paper surface left side is a high pressure side, and a paper surface right side is a low pressure side. To be specific, a gas flows from the paper surface left side to the paper surface right side. Thus, the paper surface left side is an upstream side of the gas, and the paper surface right side is a downstream side of the gas.

As shown in FIG. 1, the labyrinth seal 100 according to the present embodiment includes a first structure 10 and a second structure 20. In the present embodiment, the first structure 10 is located on an outer peripheral portion of the rotary body, and the second structure 20 is located on an inner peripheral portion of the stationary body. Hereinafter, the first structure 10 and the second structure 20 will be described in order.

First Structure

The first structure 10 is located on the outer peripheral portion of the rotary body as described above and has a cylindrical shape. The first structure 10 includes an inlet surface 11, an inclined surface 12, a downstream wall surface 13, a first outlet surface 14, and seal fins 15.

The inlet surface 11 is a portion located at a most upstream side of the first structure 10 and is located upstream of a most upstream one of the seal fins 15. The inlet surface 11 of the present embodiment extends in parallel with the axial direction. To be specific, a radial position of the inlet surface 11 in the axial direction is constant.

The inclined surface 12 is a portion located downstream of the inlet surface 11 and adjacent to the inlet surface 11. In the present embodiment, the inclined surface 12 is inclined such that a downstream portion thereof is located at the radially outer side of an upstream portion thereof. In a sectional view, the inclined surface 12 of the present embodiment is inclined linearly but may be inclined stepwise. Moreover, in a sectional view, the inclined surface 12 may have a curved shape or a shape that is a combination of a linear shape and a curved shape.

The downstream wall surface 13 is a portion located downstream of the inclined surface 12 and adjacent to the inclined surface 12. A base end portion of the downstream wall surface 13 of the present embodiment is continuous with the inclined surface 12 and is curved. A tip portion of the downstream wall surface 13 of the present embodiment extends toward the second structure 20. Moreover, a tip of the downstream wall surface 13 is located at a side (the radially outer side in the present embodiment) of a tip of a most downstream one of the seal fins 15, the side being close to the second structure 20 in the radial direction. Moreover, an axial distance between the downstream wall surface 13 and the most downstream seal fin 15 is equal to an axial distance between the adjacent seal fins 15.

The first outlet surface 14 is a portion located downstream of the downstream wall surface 13 and adjacent to the downstream wall surface 13. The first outlet surface 14 is located at a most downstream side of the first structure 10. A radial position of the first outlet surface 14 of the present embodiment in the axial direction is constant. To be specific, the first outlet surface 14 extends from the tip of the downstream wall surface 13 toward the downstream side in the axial direction. However, the radial position of the first outlet surface 14 in the axial direction does not have to be constant. Moreover, in the present embodiment, an angle between the downstream wall surface 13 and the first outlet surface 14 is smaller than 90°.

The seal fins 15 extend from the first structure 10 toward the second structure 20. A radial gap is between each seal fin 15 and the second structure 20. The seal fins 15 are located on the inclined surface 12. The seal fins 15 are located at regular intervals in the axial direction. The seal fins 15 may extend in the radial direction or may extend in a direction inclined relative to the radial direction.

In a sectional view, a tip of the seal fin 15 has an acute angle. However, the shape of the tip of the seal fin 15 is not limited to this. Moreover, the seal fins 15 of the present embodiment are the same in shape and size as each other. However, the shape and size of the seal fin 15 are not especially limited. Furthermore, the first structure 10 of the present embodiment includes four seal fins 15. However, the number of seal fins 15 included in the first structure 10 is not especially limited.

The dimension of the radial gap between the first outlet surface 14 and the second structure 20 (second outlet surface 22) is larger than the dimension of the radial gap between the seal fin 15 and the second structure 20.

Second Structure

The second structure 20 is a structure opposed to the first structure 10. The second structure 20 is located on the inner peripheral portion of the stationary body and has a cylindrical shape. The second structure 20 includes step surfaces 21, the second outlet surface 22, and a cavity surface 23.

The step surfaces 21 are located so as to correspond to the above-described seal fins 15. Therefore, the step surfaces 21 are opposed to the respective seal fins 15. A radial gap is between each step surface 21 and each seal fin 15. Moreover, the second structure 20 of the present embodiment includes four step surfaces 21, the number of which is equal to the number of seal fins 15. However, the number of step surfaces 21 included in the second structure 20 is not especially limited.

Moreover, the step surfaces 21 extend in parallel with the axial direction. To be specific, a radial position of each step surface 21 in the axial direction is constant. Furthermore, the step surface 21 that is located at the downstream side is located at the radially outer side. Therefore, the entirety of the step surfaces 21 is inclined so as to be located at the radially outer side as it extends toward the downstream side.

The second outlet surface 22 is located at a most downstream side of the second structure 20. The second outlet surface 22 is opposed to the first outlet surface 14. Moreover, a gap is between the first outlet surface 14 and the second outlet surface 22. As described above, the dimension of the radial gap between the first outlet surface 14 and the second outlet surface 22 is larger than the dimension of the radial gap between the seal fin 15 and the second structure 20.

A radial position of the second outlet surface 22 of the present embodiment in the axial direction is constant. Therefore, even when the relative positions of the first structure 10 and the second structure 20 in the axial direction slightly deviate from each other, the dimension of the radial gap between the first outlet surface 14 and the second outlet surface 22 does not change and is maintained constant.

The cavity surface 23 is connected to a most downstream one of the step surfaces 21. Moreover, the cavity surface 23 is located upstream of the second outlet surface 22 and is adjacent to the second outlet surface 22. To be specific, the cavity surface 23 is located between the most downstream step surface 21 and the second outlet surface 22. The cavity surface 23 is recessed in a direction away from the first structure 10 (in the present embodiment, outward in the radial direction). To be specific, when viewed from the first structure 10, a bottom portion of the cavity surface 23 is located farther than the second outlet surface 22.

In a sectional view, the cavity surface 23 of the present embodiment is curved. However, the cavity surface 23 may have another shape, such as a shape defined by straight lines connected to each other in a sectional view. Moreover, a radial distance from a downstream end portion of the most downstream step surface 21 to the bottom portion of the cavity surface 23 is larger than a radial dimension of the most downstream seal fin 15. Furthermore, a boundary between the second outlet surface 22 and the cavity surface 23 is located downstream of a boundary between the downstream wall surface 13 and the first outlet surface 14 in the axial direction.

The second structure 20 is such that when each seal fin 15 is regarded as a reference, a portion of the second structure 20 which is located downstream of the seal fin 15 does not overlap the seal fin 15 when viewed in the axial direction. For example, when the most upstream seal fin 15 is regarded as a reference, a portion of the second structure 20 which is located downstream of the most upstream seal fin 15 is located at the radially outer side of the most upstream seal fin 15, and the most upstream seal fin 15 and the portion of the second structure 20 which is located downstream of the most upstream seal fin 15 do not overlap each other when viewed in the axial direction. Therefore, the rotary body and the stationary body can be assembled by inserting the rotary body into the stationary body in the axial direction without bringing portions of the first structure 10 and portions of the second structure 20 into contact with each other.

Flow of Gas

Next, the flow of the gas passing through between the first structure 10 and the second structure 20 will be described. Herein, a space 30 surrounded by the most downstream seal fin 15, the downstream wall surface 13, and the cavity surface 23 is referred to as a "downstream space." In this case, the air having passed through a gap between the downstream seal fin 15 and the second structure 20 which is an inlet of the downstream space 30 flows along the axial direction and then collides with the downstream wall surface 13. After that, the flow of the gas is divided into the flow toward the radially outer side and the flow toward the radially inner side.

The gas flowing toward the radially inner side generates a first vortex V1 in a region located at the radially inner side of the tip of the most downstream seal fin 15. On the other hand, the gas flowing toward the radially outer side flows along the downstream wall surface 13, and then, flows along the cavity surface 23 across a gap between the first outlet surface 14 and the second outlet surface 22 which is an outlet of the downstream space 30. With this, the gas generates a large second vortex V2 in a region located at the radially outer side of the tip of the most downstream seal fin 15. As a result, the flow (arrow shown by a broken line in FIG. 1) of the air passing through the outlet of the downstream space 30 is suppressed, and therefore, a leakage amount of gas at an outlet portion of the labyrinth seal 100 can be effectively suppressed.

Moreover, in the present embodiment, the boundary between the second outlet surface 22 and the cavity surface 23 is located downstream of the boundary between the downstream wall surface 13 and the first outlet surface 14 in the axial direction. Furthermore, the angle between the downstream wall surface 13 and the first outlet surface 14 is smaller than 90°. Therefore, the gas flowing along the downstream wall surface 13 toward the radially outer side easily separates from the first outlet surface 14. As a result, the area of the passage at the outlet of the downstream space 30 becomes practically small, and therefore, the flows of the air passing through the outlet of the downstream space 30 is further suppressed.

Embodiment 2

Figure 2:
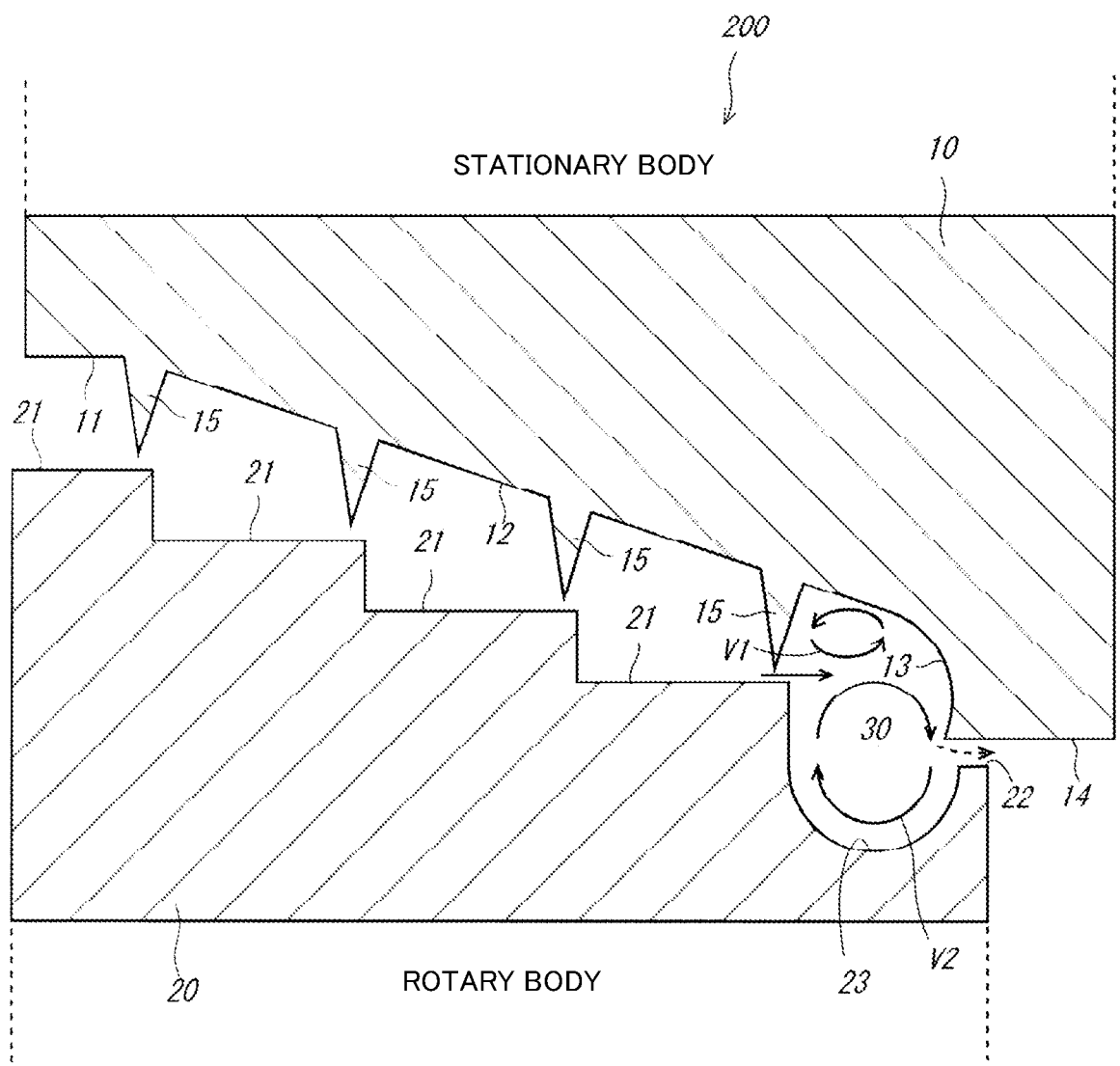
FIG. 2 is a sectional view of the labyrinth seal according to Embodiment 2.

Next, a labyrinth seal 200 according to Embodiment 2 will be described. FIG. 2 is a sectional view of the labyrinth seal 200 according to Embodiment 2 and corresponds to FIG. 1 of Embodiment 1. In FIG. 2, the same reference signs are used for the same components as in FIG. 1 and corresponding components to FIG. 1, and explanations of the above-described components are omitted.

The labyrinth seal 100 according to Embodiment 1 and the labyrinth seal 200 according to Embodiment 2 are different from each other in that: in Embodiment 1, the first structure 10 is located on the outer peripheral portion of the rotary body, and the second structure 20 is located on the inner peripheral portion of the stationary body; and in Embodiment 2, the first structure 10 is located on the inner peripheral portion of the stationary body, and the second structure 20 is located on the outer peripheral portion of the rotary body.

In the labyrinth seal 200 according to the present embodiment, unlike Embodiment 1, the inclined surface 12 is inclined such that the downstream portion thereof is located at the radially inner side of the upstream portion thereof. Moreover, the entirety of the step surfaces 21 is inclined so as to be located at the radially outer side as it extends toward the downstream side.

In the present embodiment, the first structure 10 includes the downstream wall surface 13, and the second structure 20 includes the cavity surface 23. Therefore, the gas generates the large second vortex V2 in a region located at the radially inner side of the tip of the most downstream seal fin 15 in the downstream space 30. As a result, the flow (arrow shown by a broken line in FIG. 2) of the air passing through the outlet of the downstream space 30 is suppressed, and therefore, the leakage amount of gas at the outlet portion of the labyrinth seal 100 can be effectively suppressed.

Operational Advantages

The foregoing has described the labyrinth seal according to Embodiment 1 and the labyrinth seal according to Embodiment 2. As described above, the labyrinth seal according to each embodiment includes: a first structure; and a second structure opposed to the first structure. The first structure includes: seal fins located at intervals in an axial direction and extending toward the second structure; a downstream wall surface located downstream of a most downstream one of the seal fins and extending toward the second structure, a tip of the downstream wall surface being located at a side of a tip of the most downstream seal fin, the side being close to the second structure in a radial direction; and a first outlet surface extending from the tip of the downstream wall surface toward a downstream side in the axial direction. The second structure includes: a second outlet surface opposed to the first outlet surface, a radial gap being between the first outlet surface and the second outlet surface; and a cavity surface located upstream of the second outlet surface in the axial direction and adjacent to the second outlet surface, the cavity surface being recessed in a direction away from the first structure.

According to this configuration, the gas having passed through the most downstream seal fin collides with the downstream wall surface, then flows along the downstream wall surface, and further flows along the cavity surface. With this, a vortex is generated in a downstream space surrounded by the most downstream seal fin, the downstream wall surface, and the cavity surface. As a result, even when the dimension of the gap between the first downstream surface and the second downstream surface which is the outlet of the downstream space is slightly large, the outflow of the gas through the gap between the first downstream surface and the second downstream surface can be suppressed. Therefore, according to the above labyrinth seal, a leakage amount of gas at an outlet portion can be effectively suppressed.

In the labyrinth seal according to the embodiment, the cavity surface is curved in a sectional view.

According to this configuration, since the gas smoothly flows along the cavity surface, a further strong vortex can be generated in the downstream space, and therefore, the leakage amount of gas at the outlet portion of the labyrinth seal can be further effectively suppressed.

Moreover, in the labyrinth seal according to the embodiment, a boundary between the second outlet surface and the cavity surface is located downstream of a boundary between the downstream wall surface and the first outlet surface in the axial direction.

According to this configuration, the gas flowing along the downstream wall surface toward the radially outer side easily separates from the first outlet surface. As a result, the flow of the air passing through the outlet of the downstream space can be further suppressed, and therefore, the leakage amount of gas at the outlet portion of the labyrinth seal can be further effectively suppressed.

Moreover, in the labyrinth seal according to the embodiment, an angle between the downstream wall surface and the first outlet surface is smaller than 90°.

Also in this configuration, the gas flowing along the downstream wall surface toward the radially outer side easily separates from the first outlet surface. As a result, the flow of the air passing through the outlet of the downstream space can be further suppressed, and therefore, the leakage amount of gas at the outlet portion of the labyrinth seal can be further effectively suppressed.

Moreover, in the labyrinth seal according to the embodiment, the second structure includes surfaces opposed to the respective seal fins, and a radial distance from a downstream end portion of the surface of the second structure which is opposed to the most downstream seal fin to a bottom portion of the cavity surface is larger than a radial dimension of the most downstream seal fin.

According to this configuration, the flow of the air is largely changed by the cavity surface. Therefore, a further strong vortex can be generated in the downstream space, and therefore, the leakage amount of gas at the outlet portion of the labyrinth seal can be further effectively suppressed.

Moreover, the gas turbine according to the embodiment includes the above-described labyrinth seal.

The invention claimed is:

1. A labyrinth seal comprising:
   a first structure; and
   a second structure opposed to the first structure, wherein:
   the first structure includes
      seal fins located at intervals in an axial direction and extending toward the second structure,
      a downstream wall surface located downstream of a most downstream one of the seal fins and extending toward the second structure, a tip of the downstream wall surface being located at a side of a tip of the most downstream seal fin, the side being close to the second structure in a radial direction, and
      a first outlet surface extending from the tip of the downstream wall surface toward a downstream side in the axial direction;
   the second structure includes
      a second outlet surface opposed to the first outlet surface, a radial gap being between the first outlet surface and the second outlet surface, and
      a cavity surface located upstream of the second outlet surface in the axial direction and adjacent to the second outlet surface, the cavity surface being recessed in a direction away from the first structure,
   wherein the cavity surface is curved in a sectional view.

2. The labyrinth seal according to claim 1, wherein a boundary between the second outlet surface and the cavity surface is located downstream of a boundary between the downstream wall surface and the first outlet surface in the axial direction.

3. The labyrinth seal according to claim 1, wherein an angle between the downstream wall surface and the first outlet surface is smaller than 90°.

4. The labyrinth seal according to claim 1, wherein:
   the second structure includes surfaces opposed to the respective seal fins; and
   a radial distance from a downstream end portion of the surface of the second structure which is opposed to the most downstream seal fin to a bottom portion of the cavity surface is larger than a radial dimension of the most downstream seal fin.

5. A gas turbine comprising the labyrinth seal according to claim 1.

* * * * *